United States Patent
Kohut et al.

(10) Patent No.: US 7,302,435 B2
(45) Date of Patent: Nov. 27, 2007

(54) MEDIA STORAGE AND MANAGEMENT SYSTEM AND PROCESS

(75) Inventors: Michael Kohut, La Quinta, CA (US);
Larry Goodman, Los Angeles, CA (US); Mark Koffman, Encino, CA (US); Jim Mercs, Huntington Beach, CA (US)

(73) Assignees: Sony Corporation, Tokyo (JP); Sony Pictures Entertainment Inc., Culvery City, CA (US)

( * ) Notice: Subject to any disclaimer, the term of this patent is extended or adjusted under 35 U.S.C. 154(b) by 446 days.

(21) Appl. No.: 10/109,815

(22) Filed: Mar. 29, 2002

(65) Prior Publication Data

US 2003/0187863 A1 Oct. 2, 2003

(51) Int. Cl.
*G06F 12/00* (2006.01)
*G06F 7/00* (2006.01)
(52) U.S. Cl. ............................ 707/100; 707/204
(58) Field of Classification Search ............ 707/1–4, 707/100, 200, 204
See application file for complete search history.

(56) References Cited

U.S. PATENT DOCUMENTS

| | | | |
|---|---|---|---|
| 5,469,560 A * | 11/1995 | Beglin | 711/112 |
| 6,260,040 B1 * | 7/2001 | Kauffman et al. | 707/10 |
| 6,330,572 B1 | 12/2001 | Sitka | |
| 6,341,290 B1 * | 1/2002 | Lombardo et al. | 707/104.1 |
| 6,366,914 B1 | 4/2002 | Stern | |
| 6,415,280 B1 * | 7/2002 | Farber et al. | 707/3 |
| 6,484,199 B2 | 11/2002 | Eyal | |
| 6,640,217 B1 * | 10/2003 | Scanlan et al. | 707/1 |
| 6,647,396 B2 | 11/2003 | Parnell et al. | |
| 6,728,849 B2 | 4/2004 | Kodama | |
| 6,760,721 B1 | 7/2004 | Chasen et al. | |
| 6,778,978 B1 * | 8/2004 | Lee | 707/3 |
| 6,782,394 B1 | 8/2004 | Landeck et al. | |
| 2003/0163457 A1 | 8/2003 | Yano et al. | |
| 2004/0015441 A1 * | 1/2004 | Ebihara et al. | 705/50 |

* cited by examiner

*Primary Examiner*—Sam Rimell
(74) *Attorney, Agent, or Firm*—Samuel S. Lee; Procopio, Cory, Hargreaves & Savitch LLP (57) ABSTRACT

A system and method for managing a plurality of content items employs a plurality of storage volumes that may be checked out, with or without previously archived content items stored on them, and that may be checked in, with or without new or changed content items stored on them. The content items may be audio content, video content, audio/video content, or the like. The plurality of storage volumes may be removable hard disk drives, virtual storage, storage locations on a storage device or devices, or the like. When a storage volume is checked in, embodiments of the system and method may detect whether new or changed content items are stored on the storage volume and any new or changed content items may be archived. When a content item is archived, the content may be stored along with related metadata and with an association between the content item and the related metadata.

33 Claims, 7 Drawing Sheets

| DISPLAYED NAME | |
|---|---|
| Physical Assets | # of Channels |
| Asset Type | Channel Descriptor 1 |
| Asset Format | Channel Descriptor 2 |
| Partitioning Method | Originating Facility |
| Maximum # of Partitions | Barcode 1 |
| Partition # | Barcode 2 |
| Notes | Barcode 3 |
| Title | Sync system |
| Episodic | Bit Depth |
| Episode # | Sample Rate |
| Episode Title | Language |
| Version | Descriptor 1 |
| Version Qualifier | Descriptor 2 |
| Physical Condition | # of channels |
| Digital Assets | File Format |
| Tape Format | Software Version |
| Sub-tape Format | Run Time |
| Head Setup | Channel Descriptor 1 |
| Tape Speed | Channel Descriptor 2 |
| Sync System | Mixing Stage |
| Bit Depth | Crew |
| Sample Rate | Hard Drive Management |
| Language | Title |
| Descriptor 1 | Version |
| Descriptor 2 | Telescope Operator |
| Noise Reduction | Receiver (TS op) |
| Film/MAG Format | Check-out Date |
| Video Format | Check-in Date |
| Standard | Drive Size |
| Data Media | Drive Type |
| Recording Date | Drive Interface |
| Run Time | BARCODE |
| | Available |

FIG. 5

| SORT CODE | DIGITAL MEDIA | METADATA FILE |
|---|---|---|
| 1 | Dialog1 | Metadata-1 |
| 2 | SoundEffect1 | Metadata-2 |
| 3 | SoundEffect2 | Metadata-3 |
| 4 | DialogScene3 | Metadata-4 |
| ... | ... | ... |
| n | Dialog | Metadata-n |

FIG. 6

MEDIA STORAGE AND MANAGEMENT SYSTEM AND PROCESS

RELATED APPLICATION

The present disclosure relates to co-pending U.S. patent application Ser. No. 10/109,798, titled "Media Management System and Process", which is incorporated herein by reference.

BACKGROUND OF THE INVENTION

1. Field of the Invention

The invention relates to a system and a method for managing media storage and, in particular embodiments, to a system and method for managing storage of content items, such as, for example, audio content, by employing a plurality of storage volumes, each of which may be checked out, with or without archived content items copied onto the storage volume, and each of which may be checked in, at which time altered content items and new content items may be archived.

2. Related Art

Audio and visual content items may be stored in a variety of physical media including film, optical (CDs and DVDs), and magnetic. As used herein, the expression "content items" broadly and generally refers to information stored on a physical media. Examples of content items may include audio data, such as music, dialog, movie soundtracks, sound effects, or other like audio data. Examples of content items also may include visual data, such as video, including, but not limited to, movies, television programs, animation, home video, and the like. Examples of visual data may also include still images, such as pictures, writings, charts, or other like images. Other like content items, including combinations of content items (e.g. audio and video data associated with a movie) may also be included. There are a variety of problems associated with conventional means for storing content items, including the possibility of (1) lost or misplaced content items; (2) deterioration of content items; (3) difficulty in locating and/or retrieving content items; and (4) information loss during production.

Content items may be lost or misplaced. Content items stored on a physical media may be difficult to locate after some time has passed. For example, in the case of movie audio, large amounts of audio data may be generated that ultimately is not mixed into a movie soundtrack. The audio data may be stored on magnetic tape, film, or computer disks. These physical media may be labeled and stored. However, the physical media may also be misplaced, mislabeled, or otherwise difficult to locate after some time has passed.

Content items stored on a physical media also may be subject to deterioration over time. This may be particularly problematic for content items stored in an analog format. For example, content items stored on magnetic tape or on film may be subject to deterioration. As such, someone desiring, for example, audio tracks from a movie that was created several years ago may discover that the sound quality of the magnetic recordings is no longer satisfactory. In addition, the quality of an analog recording may degrade over time as copies are made of the recording, and as copies are made of copies of the recording.

In addition, there may be difficulty in locating and accessing desired content items. For example, even if audio and/or video content items are stored on a physical media and archived, it may be difficult to locate or access the specific content items desired. Content items may be created and archived by multiple people, groups, or companies. As such, it may be difficult to identify where the desired content item is archived or stored. Also, once a physical media containing the desired content item is located, it may still need to be sent or delivered to an individual who desires access to the content item. Sending or delivering a physical media may be time intensive and inefficient.

Finally, content items may not be adequately archived or stored during the production of the content items. For example, in the case of movie audio, there may be multiple phases or stages of production of the audio that are never stored or archived. Actors may record their lines multiple times and on different tracks. These types of content items may be recorded over or discarded once the movie has been completed. Similarly, sound effects and background music may be added to a movie soundtrack in multiple phases. These content items may never be archived during production of the soundtrack, which may render the content unavailable in the future. Thus, many content items may never be adequately archived. Also, much information may be lost when it is not recorded during production. After a movie has been completed, for example, it may be difficult to discern who is speaking in a particular scene, how a particular sound effect was created, or other like information that may be readily available during the production of the movie audio data.

SUMMARY OF THE DISCLOSURE

Therefore, it is an advantage of embodiments of the invention that a system and method for managing media storage may result in media content being stored at regular intervals or phases during production. Accordingly, multiple versions of content items may be available in a library of content items.

It is also an advantage of embodiments of the invention that a user may check out a storage volume with one or more content items copied onto to it and may store new versions of the copied content items on the checked out storage volume. The system may automatically archive the new versions of content items at specified times or intervals, such as, for example, when a user or operator checks in a storage volume storing new versions of copied content items.

It is a further advantage of embodiments of the system and method for managing media storage that new content items may be stored on checked out storage volumes. When a checked out storage volume is checked in, new content items stored on a checked out storage volume may be archived in a library of content items.

It is a further advantage of embodiments of the invention that new content items and new versions of content items may be archived automatically when a checked out storage volume is checked in.

In some embodiments of the invention, metadata may be generated that is related to content items being archived. The metadata may facilitate locating a particular content item after some time has passed. Thus, it is a further advantage of embodiments of the invention that there may be an improved ability to locate and retrieve content items. Metadata may be generated that is related to each content item managed. As used herein, "metadata" refers to data associated with a content item, such as, for example, an audio content item, that defines or describes information about the content item. In some embodiments, metadata may include a plurality of metadata fields. Each of the plurality of metadata fields may define a separate informational item about a content item. An association may be created to virtually link a content item to related metadata. Therefore, metadata or metadata files may be searched in order to locate a desired content item. A plurality of metadata fields may be employed to facilitate a search and retrieval process. Also, retrieval of the content items may be facilitated because each of the content items may have been digitized and stored electronically. As such, content items may be delivered electronically in a digital format, as opposed to a time intensive process of delivering content stored on a physical media.

It is yet another advantage of embodiments of the invention that media content may be archived during the production of the content. In embodiments of the invention, content items may be archived, and related metadata generated, during the production of the content. Thus, more content may be available. For example, in embodiments of the invention concerning movie audio, the movie audio data may be archived at regular intervals during its production so that multiple versions of the audio data may be available. Also, because the metadata may be generated during the production of the content items, the metadata may be highly accurate and it may contain more information than if it was created after production of the content. For example, when movie audio data is archived after a movie has been completed, some information about the audio data may no longer be available. After a movie has been completed, for example, it may be difficult to discern who is speaking in a particular scene, how a particular sound effect was created, or other like information that may be readily available during the production of the audio data.

Embodiments of the invention may comprise, for example, storing a library including a plurality of content items, checking out one or more storage volumes with or without one or more content items copied onto the storage volume being checked out, and updating the library of content items when the storage volume is checked in.

In embodiments of the invention, when a storage volume is checked out, a user may store new content items on the checked out storage volume. A user may also store new versions of content items that were copied to the checked out storage volume. When the storage volume is checked in, the contents of the storage volume may be reviewed to determine whether any new content items or any new versions of content items are stored on the storage volume. If there is a determination that new content items or new versions of content items are stored on the storage volume, then the library of content items may be updated by archiving the new content items and the new versions of content items.

In embodiments of the invention, content items may be stored in a digital format and may be sent and retrieved from multiple locations. For example, embodiments of the invention may employ the Internet, a wide area network, or another suitable network, having workstations, servers, databases, storage, and the like, that are centralized or that are dispersed geographically in multiple cities, countries, regions, or otherwise dispersed in different locations around the world. Thus, in embodiments of the invention, content items may be sent to and retrieved from multiple locations by a suitable communications means, such as by satellite, cable, fiber, telephone lines, wireless, or other suitable communications means.

Accordingly, by way of example, ingest stations may be situated in multiple countries, such as the United States, France, Germany, Italy, and Spain, so that a content item or items, such as a movie or a movie soundtrack, may be rapidly and nearly simultaneously transferred, for example, from the United States to France, Germany, Italy, and Spain. It is an advantage that such a transfer would be efficient in that physical copies of the content items would not need to be manufactured and the digital or electronic transfer could happen more quickly than delivering a physical media. It is a further advantage that the transfer may be secure in that firewalls and other suitable security measures may be employed to protect the transfer and to protect the content items. It is a further advantage that metadata may be transferred in conjunction with the transfer of the content item. The metadata may enable one to quickly and accurately learn the technical specifications of the content item or items as well as version information and other information.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

In the following, embodiments of the invention will be explained in further detail with reference to the drawings, in which:

FIG. 7 is a flow chart showing an example embodiment of a process of updating a library of content items when a storage volume is checked in.

DETAILED DESCRIPTION OF PREFERRED EMBODIMENTS

Embodiments of the present invention provide a system and a method for managing and cataloging media, such as a plurality of content items, employing a plurality of storage volumes. In embodiments of the invention, a library including a plurality of content items is employed to store the archived content items. In embodiments of the invention, a plurality of storage volumes may be employed to manage the content items stored in the library, to manage the creation and archiving of new versions of content items stored in the library, and to introduce new content items into the library. According to embodiments of the invention, a storage volume may be checked out with desired content items copied onto the storage volume. The copied content items may then be altered. Also, new content items may be stored on the storage volume. Subsequently, the storage volume may be checked in. When a storage volume is checked in, the copied content items may also be checked in. In addition, the library may be updated by archiving new versions of copied content items if the copied content items were altered and by archiving new content items if new content items are stored on the storage volume.

An example of a library system that may be employed in embodiments of the invention is disclosed in a co-pending U.S. patent application entitled, Media Management System And Process. The system and method disclosed in the co-pending patent application employs metadata that may be generated to correspond to a particular content item. The metadata may include information about the technical specifications of the corresponding content item such as sample rate, bit depth, audio format, file format, or other like information. The metadata may also include information about the content, such as subject matter, genre, character information, or other like information. The metadata may be generated when a content item is produced or created, or after a content item has been created. In embodiments of the invention, the generation of metadata in conjunction with the development of content items may facilitate archiving and retrieval of the content items.

Example embodiments in the co-pending Media Management System And Process patent application provide that once a content item and related metadata have been generated, a coding system may be employed to relate a content item to specific metadata, or to a specific file of metadata. A content item may then be stored either with related metadata or apart from related metadata. A content item may then be retrieved by referencing or searching related metadata.

In some embodiments of the current invention, the content items may be audio tracks or audio files associated with recorded video, such as, for example, audio associated with a movie. For example, a movie soundtrack may be treated as a single content item. In other embodiments, a movie soundtrack may be divided into a plurality of smaller content items, or a plurality of audio files. A movie soundtrack may be divided, for example, based on scenes in the movie, lines of particular characters, fixed time intervals, or based on other manners of division.

In embodiments concerning audio files, metadata which relates to an audio file may be generated during the development of the audio file (i.e. during the development of a movie soundtrack). In such embodiments, audio files may be archived at various stages during their production, from pre-production to production to post-production. When a content item is archived, metadata may be generated which may include information about the content, for example, the title of a movie to which an audio file relates, the language of dialog in an audio file, the run-time of the audio file, version information, or other like attributes. Metadata may also describe the technical specifications of a content item, such as sample rate, bit depth, file format, audio format, or other like technical specifications. Metadata that is related to a particular audio file may be stored in a file or table. An audio file may be virtually linked to a file or table containing related metadata by employing a coding mechanism.

In embodiments of the invention, by employing a coding mechanism, an audio file may be retrieved by reference to metadata related to the audio file. For example, in embodiments of the invention concerning movie audio, metadata may include information about a scene in a movie from which a particular audio file originated. In such embodiments, an audio file may be retrieved by searching metadata files for a particular movie scene. In other embodiments, metadata may include, for example, information about characters or actors whose voices are included in a particular audio file. In these embodiments, audio files that contain dialog by a particular movie character may be retrieved by searching the metadata for references to the particular character.

In other embodiments, the content items may be video content, such as video tracks, video files, or other video content. The content items may also be graphics, still photos, animation, or other visual content.

Figure 1:
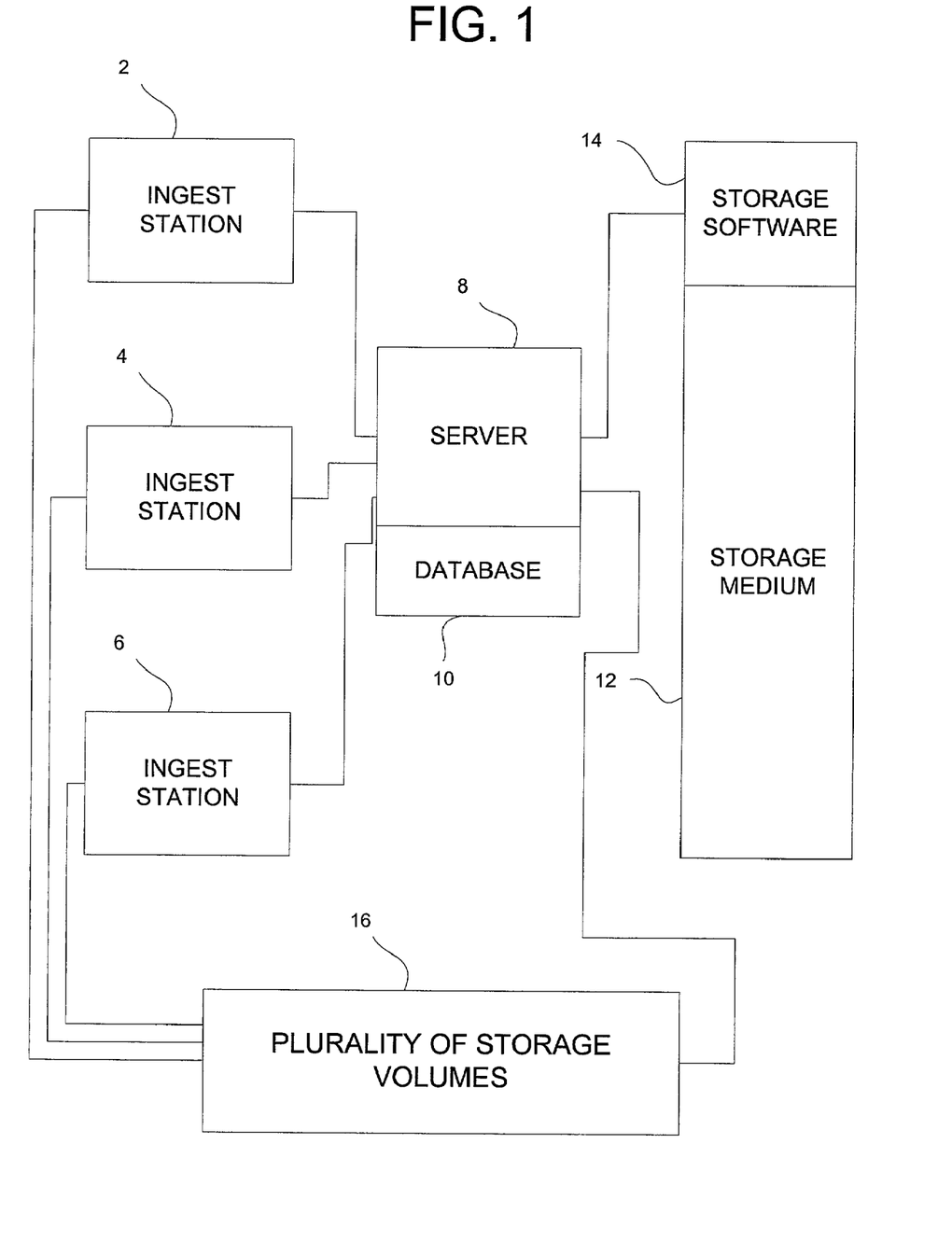
FIG. 1 is a block diagram illustrating an example hardware environment for embodiments of the invention.

An example hardware environment of embodiments of the invention is illustrated in FIG. 1. The example hardware environment in FIG. 1 includes a plurality of ingest stations 2, 4, and 6; a server 8 with a database 10; a storage medium 12 with storage software 14; and a plurality of storage volumes 16. The plurality of storage volumes 16 may be employed to check out content items, to store new versions of existing content items, and to store new content items. Ingest stations 2–6 may be employed to obtain content items stored on the plurality of storage volumes 16 and to copy archived content items to the plurality of storage volumes 16. Ingest stations 2–6 may also be employed for the addition or generation of metadata associated with particular content items.

In the example hardware environment of FIG. 1, ingest stations 2–6 are connected to a server 8, on which a database 10 is installed. In other embodiments, the database 10 may be located remote from the server 8 and accessible by the server 8 through a suitable communication link. The database 10 may store information in a manner which provides virtual links between content items and related metadata or files of metadata. The relationships between content items and metadata may be stored, for example, in a look-up table format, or the relationships may be stored in another suitable manner.

In the example hardware environment in FIG. 1, the server 8 is connected to a storage medium 12, which is under the control of storage software 14. The storage medium 12 may store content items. The storage software 14 may control the retrieval of the content items stored in the storage medium 12.

The example hardware environment shown in FIG. 1, and the elements included therein, may be varied without straying from the scope or spirit of the invention. The ingest stations 2–6 may comprise workstations, terminals, personal computers, or other suitable devices that may be employed to obtain, and in some embodiments digitize, content items. An example ingest station is illustrated in FIG. 2.

Figure 2:
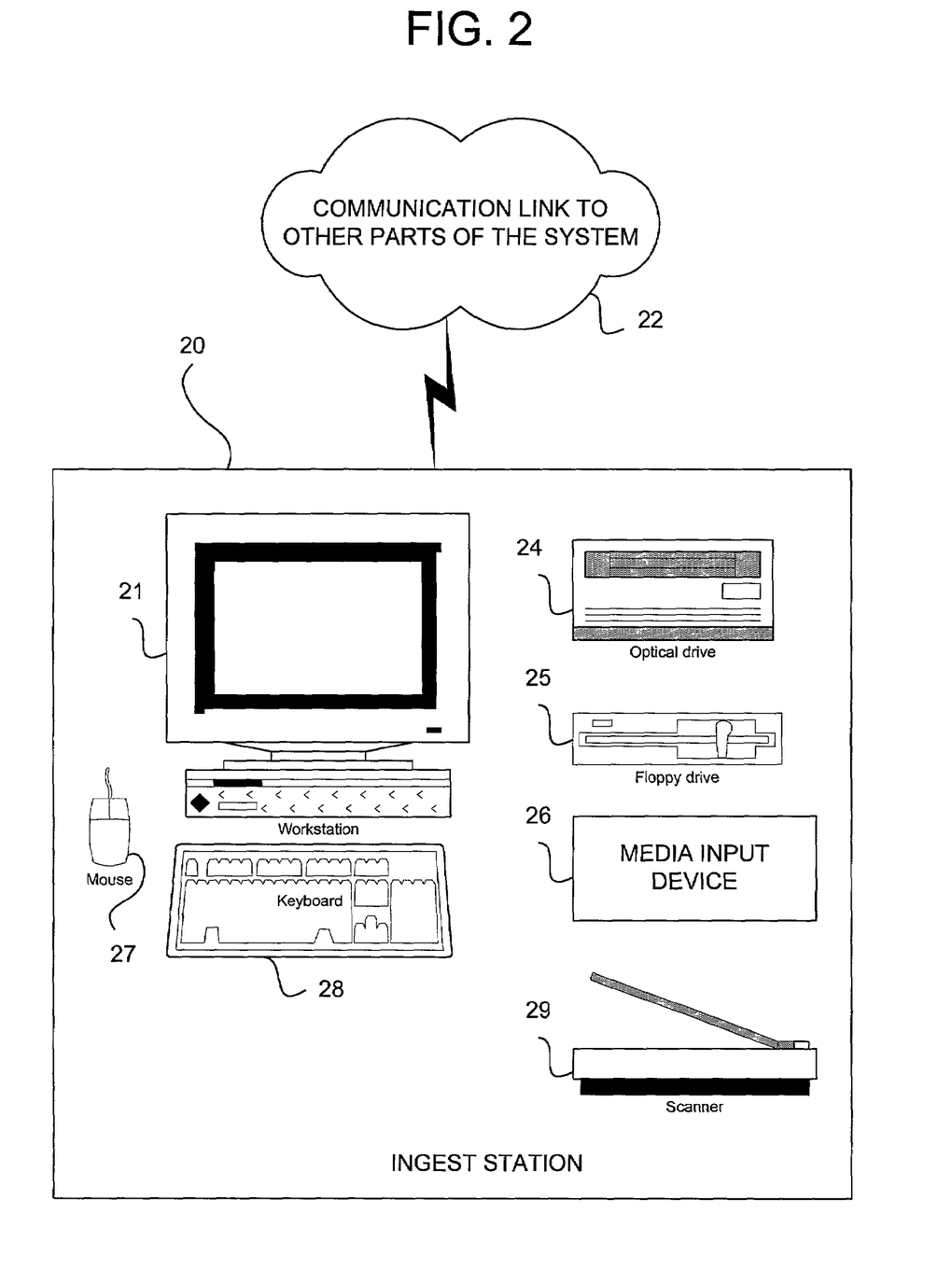
FIG. 2 is a representative view of an example ingest station that may be employed in embodiments of the invention.

The example ingest station 20 illustrated in FIG. 2 comprises a workstation 21 having a communication link 22 to other parts of the system (such as the server 8 shown in FIG. 1). The workstation shown in FIG. 2 includes an optical drive 24, a floppy drive 25, and a media input device 26, any of which may be employed to obtain, input, and/or digitize content items. The media input device 26 may comprise one or more media playing devices (not shown), such as an audio tape player, a videotape player, a film player/projector, or another suitable device or devices, connected to the workstation for inputting content items into the system. An ingest station may also include other input devices, such as a mouse 27, a keyboard 28, a scanner 29, and other suitable input devices, which an operator may employ to input metadata.

In FIG. 1, the server 8 allows for multiple ingest stations to be part of a single media management system. Other embodiments, however, may employ a single ingest station without a server. In such embodiments, a database may be installed, for example, in the ingest station. In further embodiments, multiple servers and multiple databases may be employed, either in a single location or in multiple locations.

In the example hardware environment in FIG. 1, the storage medium 12 stores the content items. The storage medium 12 may be any suitable storage device or devices, including, but not limited to, disk storage, tape storage, digital cartridge storage, or the like. The storage medium 12 may include a plurality of storage devices of the same type or of different types. In some embodiments, the storage medium 12 may comprise a mass storage facility comprising an array of storage media, such as disks or tapes. The storage medium 12 may be controlled by storage software 14. Storage software 14 may be employed for retrieving content items from the storage medium 12.

Also in the example hardware environment in FIG. 1, the plurality of storage volumes 16 are employed for checking out archived content items and checking in altered or new content items. In FIG. 1, the plurality of storage volumes 16 is shown connected to the ingest stations 2–6 and the server 8. In some embodiments, the plurality of storage volumes may comprise a plurality of separate storage mediums, a single storage medium divided into a plurality of virtual storage mediums or partitions, or the like. The plurality of storage mediums may store content items and may be operable to transfer the content items to the ingest stations 2–6 and/or to the server 8. In other embodiments, the plurality of storage volumes 16 may include a plurality of separate, portable storage mediums, such as, for example, removable hard disk drives, portable storage cartridges, digital tape, or other like portable storage mediums or combinations of such. In these embodiments, the ingest stations 2–6 and the server 8 may be configured to exchange data with the plurality of storage volumes 16 through a suitable interface.

An example hardware environment may employ a TeleScope Enterprise application and implementation provided by North Plains Systems Corporation, located in Mississauga, ON Canada. In such an embodiment, a TeleScope Database & Application Server may comprise a Sun E420R server, Oracle 8i software, and ADIC AMASS software. In this embodiment, the storage medium 12 may comprise an ADIC Scalar 1000. An ingest station 2–6 may comprise a TeleScope Windows Client with an Oracle ODBC driver and a Fibre NIC card. The plurality of storage volumes 16 may comprise removable hard disk drives. Firewalls (not shown) and other suitable security devices and measures may also be employed. This example hardware environment is merely an example provided for illustrative purposes. Other suitable hardware environments may be employed with different servers (or without a server), different software applications, and different storage mediums. Indeed, suitable hardware environments may range in scale from a single personal computer to a large, distributed network, or the like.

For example, in embodiments of the invention, content items may be stored in a digital format and may be sent and retrieved from multiple locations. For example, embodiments of the invention may employ the Internet, a wide area network, or another suitable network, having ingest stations, servers, databases, storage mediums, and the like, that are dispersed geographically in multiple cities, countries, regions, or otherwise dispersed in different locations around the world. Thus, in embodiments of the invention, content items may be sent and retrieved from multiple locations by a suitable communications means, such as by satellite, cable, fiber, telephone lines, wireless, or other suitable communications means.

Accordingly, by way of example, ingest stations may be situated in multiple countries, such as the United States, France, Germany, Italy, and Spain, so that a content item or items, such as a movie or a movie soundtrack, may be rapidly and nearly simultaneously transferred, for example, from the United States to France, Germany, Italy, and Spain. Servers and storage mediums may also be situated in each of those countries. The ingest stations or the servers in each country may be linked by a suitable communications means, such as by satellite, cable, fiber, telephone lines, wireless, or other suitable communications means. Content items may be stored in one location or in multiple locations. Content items may also be retrievable from the multiple locations over the communications link, regardless of where the particular content item is stored. Therefore, for example, a movie soundtrack may be stored in different countries in different languages. Music or sound effects may be distributed to each of the countries nearly simultaneously to add to or mix with the different language soundtracks. Video may also be distributed to each of the countries over the system. Indeed, in some embodiments of the invention, an entire movie may be nearly simultaneously distributed to each of multiple countries quickly and efficiently. It is an advantage that such a transfer would be efficient in that physical copies of the content items would not need to be manufactured and the digital or electronic transfer could happen more quickly than delivering a physical media. It is a further advantage that the transfer may be secure in that firewalls and other suitable security measures may be employed to protect the transfer and to protect the content items. It is a further advantage that metadata may be transferred in conjunction with the transfer of the content item. The metadata may enable one to quickly and accurately learn the technical specifications of the content item or items as well as version information and other information.

Indeed, embodiments of the invention may employ a digital distribution of content items on a large scale, such as to multiple countries, or on a smaller scale, such as to multiple movie theaters. Embodiments of the invention may employ different geographical configurations without deviating from the scope or spirit of the invention.

Figure 6:
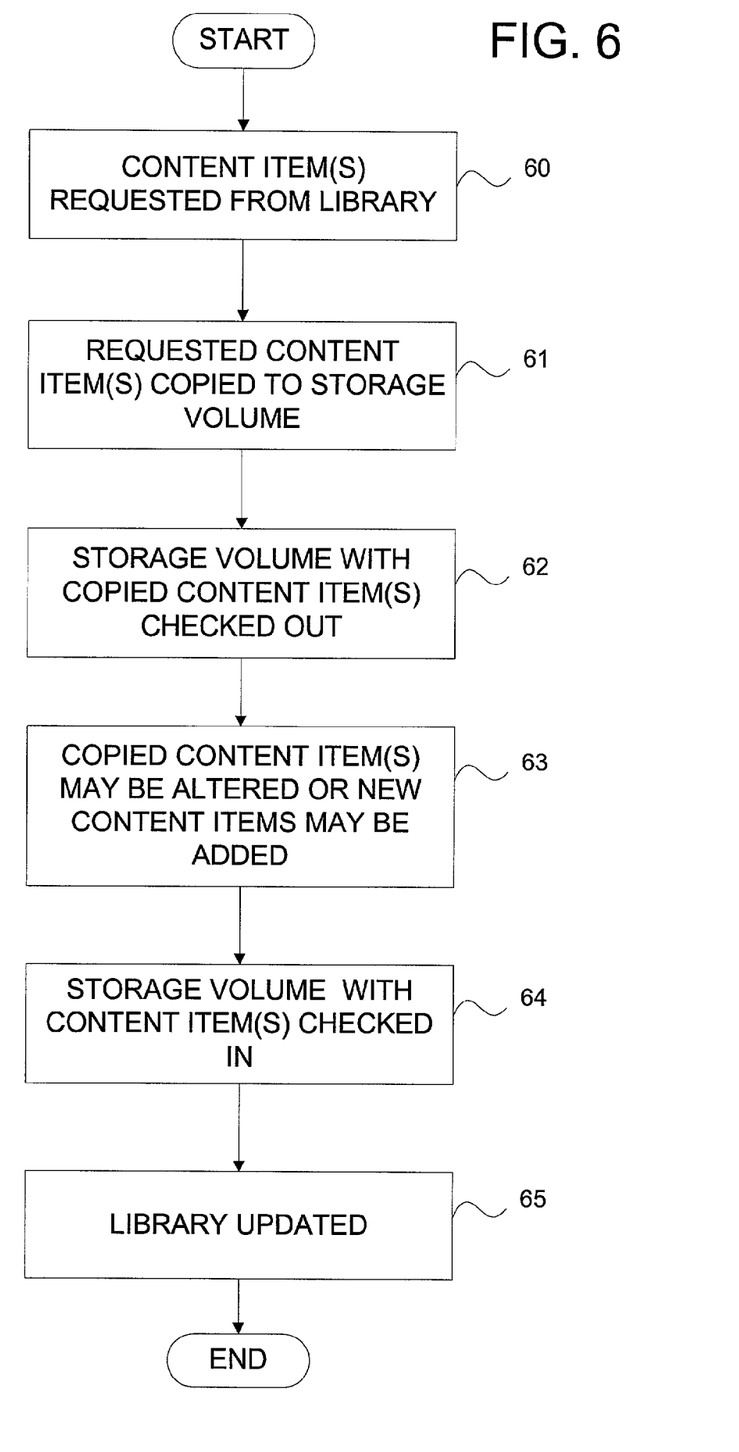
FIG. 6 is a flow chart showing an example embodiment of a system and method for managing media storage according to the invention.

Next, a method for managing media storage according to embodiments of the invention employing a plurality of storage volumes will be described. An example embodiment of a portion of a method for managing media storage according to the invention is illustrated in FIG. 6. Initially, a user may request content items from a library of content items (60). The system may then locate and copy requested items to a storage volume (61) and check out the copied content items and the storage volume to the user (62). The user may then work on existing content items or create new content items (63), storing the altered or new content items on the checked out storage volume. At a selected time or a selected interval, the user may check in the storage volume (64). When the storage volume is checked in, the library may be updated with new versions of existing content items and/or with new content items (65). Thus, an embodiment of the invention comprises checking out a storage volume with or without archived content items, storing new content items or altered content items on a checked out storage volume, checking in the storage volume, and updating a library of content items by archiving any new or altered content items from the storage volume.

In embodiments employing a system disclosed in co-pending patent application Media Management System And Process, metadata may be generated during the production or creation of a content item. The metadata may be stored with a content item on a checked out storage volume, or the related metadata may be stored separately from the content item and input into the system when a storage volume is checked in. Ultimately, an archived content item may be retrieved based at least in part on the metadata related to that content item.

In example embodiments of the invention, the content items being managed may include audio data from a movie or movies. However, embodiments of the invention may include other types of media or content, or audio content from sources other than movies, including, but not limited to, content from such sources as television programs, documentaries, educational or training programs, animated programs, graphical presentations, or the like.

In an example embodiment of the invention, movie audio data, for example, may be produced and stored directly on a checked out storage volume. In such an embodiment, a user desiring to produce a content item, such as movie audio data that may be archived in the system, may request to check out one of the plurality of storage volumes. In an example embodiment, the plurality of storage volumes may include a plurality of removable hard disk drives. In such an embodiment, the server 8 (FIG. 1) may store a record of each of the plurality of hard disk drives. When a user makes a request to check out one of the plurality of hard disk drives, the server determines which of the plurality of hard disk drives is available and assigns an available drive to be checked out to a particular user.

When a user makes a request to check out a hard disk drive, the user may also request to check out one or more archived content items. A user may desire to check out archived content items if the user is, for example, producing audio for a movie in multiple phases. In the production of movie audio, actors' voices may be added in a single phase or in multiple phases, sound effects may be added in a separate phase, and background music may be added in yet another phase. In addition, multiple voice tracks may be developed so that a movie may be released in multiple languages. Additional phases may also be employed. At selected intervals, such as, for example, at the end of each day, a user may check in a storage volume so that any content items added or altered during that day may be archived. Other intervals may be employed as will be discussed in detail below. Thus, a user may request to check out a storage volume and certain archived content items, such as, for example, dialog for a movie scene to which the user will add sound effects. The server 8 may copy requested archived content items to the storage volume to be checked out and record that the particular content items were checked out with the storage volume.

A user may store new content items and new versions of content items on a checked out storage volume. Also, in an example embodiment, metadata related to a content item, such as movie audio data, may be generated during the production of the audio data and stored on a checked out storage volume. In other embodiments, metadata may be stored somewhere other than on a checked out storage volume and input into the system when a storage volume is checked in. Thus, in embodiments of the invention, content items, such as movie audio data, may be produced or created in a conventional manner. For example, audio may be developed and recorded in either an analog or a digital format. Audio may be recorded on, for example, a CD/DVD, film, videotape or audiotape, a computer disk, or other suitable physical recording media. However, in embodiments of the invention employing the plurality of storage volumes, ultimately the audio data may be digitized and stored on a checked out storage volume. In some embodiments, audio data may be recorded directly onto a checked out storage volume in a digital format. It is an advantage of embodiments of the invention that metadata may be generated that is related to audio that may be archived during multiple phases of development of a movie soundtrack when a storage volume is checked in to the system.

For example, at selected intervals during the production or creation of movie audio data, a checked out storage volume may be checked in so that new or altered content items may be archived. Selected intervals may vary according to embodiments of the invention. For example, content items, such as audio content, may be archived daily, weekly, at the end of a recording session, at the time of completion of a particular scene or portion of a movie, or at another suitable or desired interval or combination of intervals. By selecting a more frequent interval, more information about the production of the audio content may be captured and more content items may be available.

Figure 3:
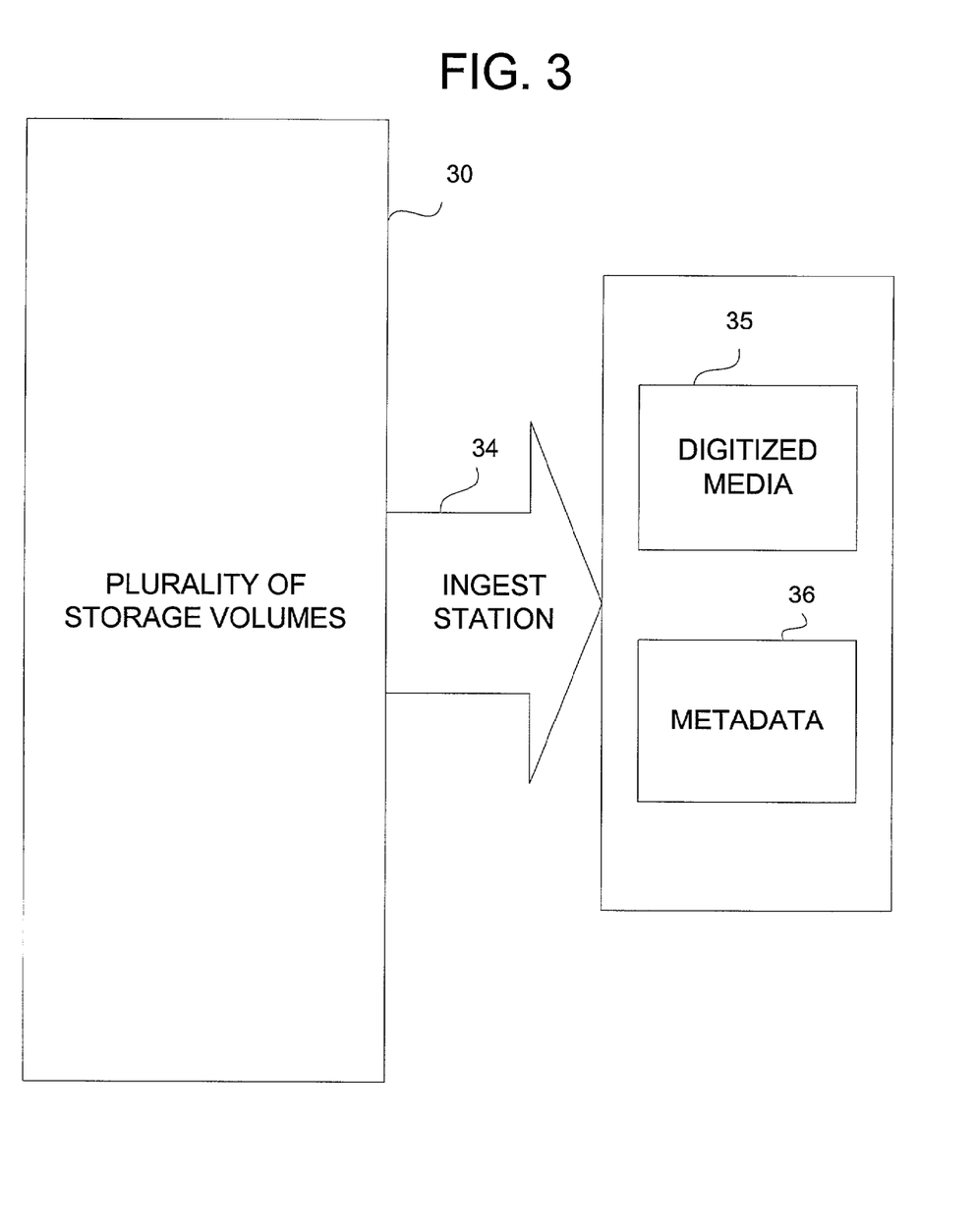
FIG. 3 is a diagram showing a portion of a function of an ingest station according to embodiments of the invention.

FIG. 3 illustrates a portion of a method, according to embodiments of the invention, for archiving content items, such as movie audio content, and related metadata, employing the plurality of storage volumes. FIG. 3 shows that audio data may be recorded directly onto one of a plurality of storage volumes 30. The audio data may have been recorded from a live presentation, copied from one or more previous recordings, or the like. At a selected interval, audio content items may be presented to an ingest station (or checked in) in a process 34. Ultimately, a content item may be archived in the system as a digitized media item 35 and related metadata 36.

In an example embodiment illustrated in FIG. 3, an ingest station may be employed to both obtain audio content items and to obtain and/or generate related metadata. As discussed herein, "metadata" refers to data associated with a content item, such as, for example, an audio content item, that defines or describes information about the content item. In an example embodiment, metadata may include a plurality of metadata fields. Each of the plurality of metadata fields may define a separate informational item about a content item.

Figure 4:
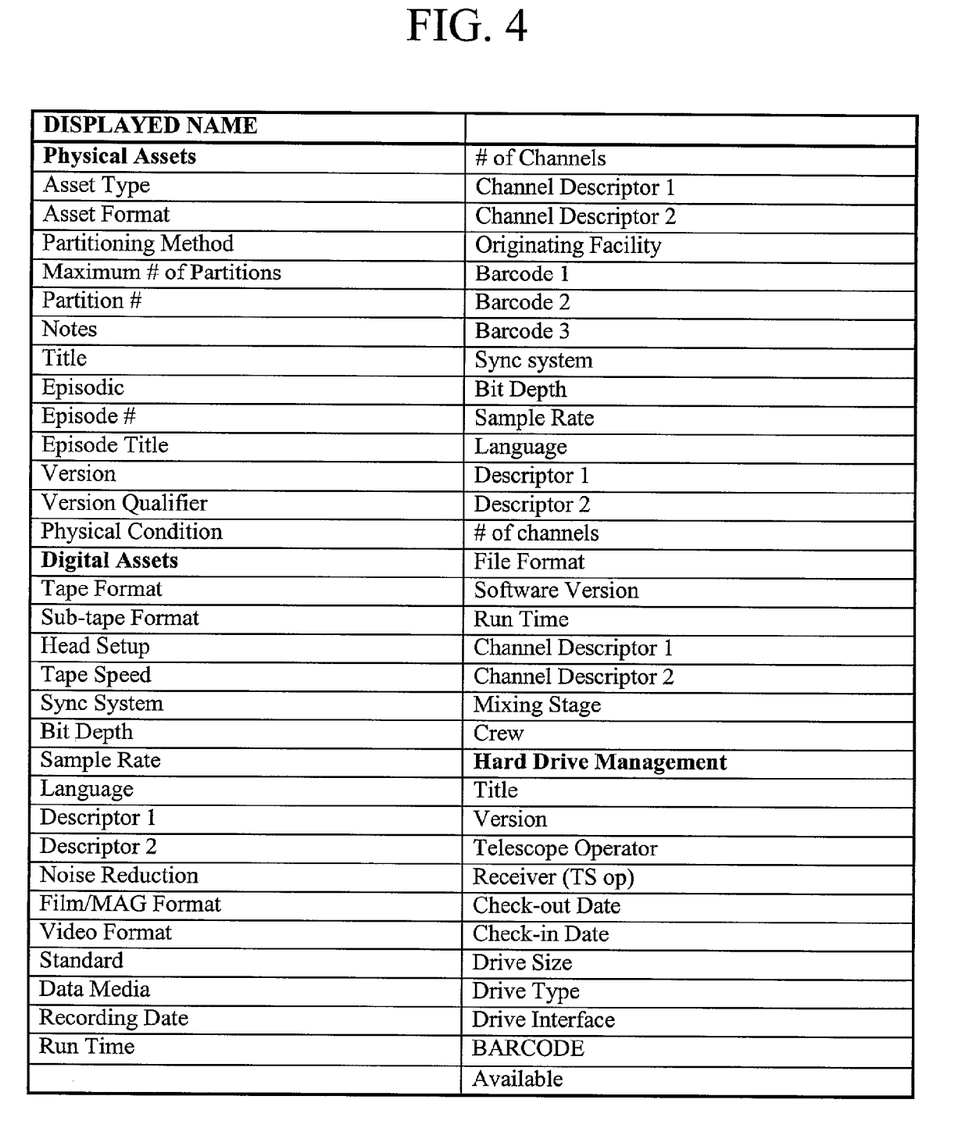
FIG. 4 shows a table that includes a plurality of example metadata fields that may be employed in embodiments of the invention.

FIG. 4 shows an example metadata matrix including a plurality of metadata fields employed in one representative embodiment of the invention. The example metadata matrix shown in FIG. 4 includes data relating to a physical asset, data relating to a digital asset, and data relating to hard drive management. A "physical asset" refers to the physical media on which a content item (i.e. audio) was originally recorded and which may be stored (in addition to the digitized content being stored in the system). A "digital asset" includes more detailed information about a digitized version of a content item. The "hard drive management" fields may be employed in embodiments in which content items are archived on hard drives. Embodiments of the invention may employ suitable metadata fields other than or in addition to the metadata fields shown in FIG. 4. Example metadata fields for movie audio may include a movie title, a movie scene, a character, an actor, and other like data that may be descriptive of the audio content item.

Figure 7:
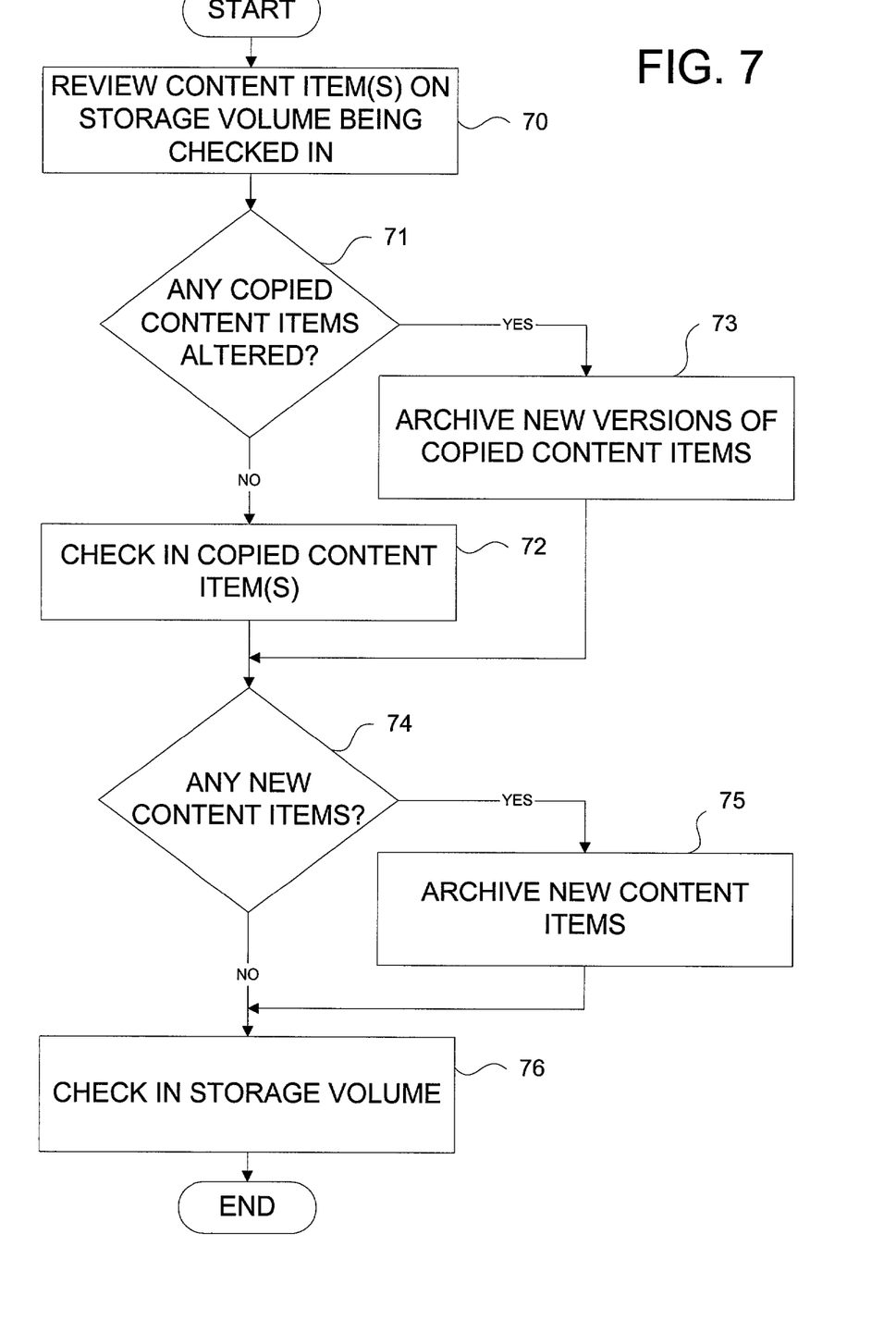

FIG. 7 illustrates a portion of a method, according to embodiments of the invention, for updating a library of content items when a checked out storage volume is checked in. An ingest station may run a program that causes the ingest station to perform functions shown in FIG. 7. A storage volume may be checked in, in embodiments in which a storage volume is a removable hard disk drive, by docking the removable hard disk drive at an ingest station. The ingest station may then review the content items on the storage volume being checked in (70). The ingest station may be programmed to detect if the checked out content items were altered while the storage volume was checked out (71). If the ingest station detects that none of the checked out content items were altered, then the ingest station may alert the server to change the status of the original content items to checked in (72).

If the ingest station detects that a checked out content item was altered, then the ingest station may archive the altered content time as a new version of an existing content item (73). For example, a user may check out a content item (on a storage volume) comprising all of the dialog for a particular movie scene. The user then may change the content item by adding, changing, or deleting dialog. When the storage volume and content item are checked in, an ingest station may recognize that the content item has been changed. An ingest station may, for example, compare the copied content item being checked in with the archived content item, from which the copy was made, to detect whether they are different. In another embodiment, a flag or code may be employed that is stored with a content item that indicates when or if a content item is altered. Other suitable manners of detecting whether a content item has been altered may also be employed.

When an ingest station detects that a checked out content item has been altered, the ingest station may then archive the altered content item as a new version of an existing content item (73, FIG. 7). A new version may be archived as a separate content item with related metadata. An ingest station may automatically generate metadata, for example, by copying the metadata associated with the original content item and incrementing the version information in a metadata field. The ingest station may also prompt a user or operator to add new metadata or to alter the metadata if necessary. For example, new metadata may have been generated when the altered content item was produced, such as a new actors' voice being added. This information may be manually entered into a metadata field for archiving. Other manners of entering new or additional metadata may also be employed, such as submitting new metadata information electronically, scanning in written metadata, or other like manners of entering metadata.

An ingest station may also determine whether any new content items are stored on a storage volume being checked in (74, FIG. 7). An ingest station may be programmed, for example, to cross-reference file names of content items stored on the storage volume with file names of content items that were checked out to the particular storage volume. If new file names are present, an ingest station may treat the new files as new content items. Accordingly, an ingest station may archive the new content items by storing the new content items in the system along with related metadata. Related metadata may be generated in any of the manners discussed herein. For example, an ingest station may prompt a user or operator to input metadata when the ingest station determines that a new content item is present to be archived. A user or operator may input the metadata manually, electronically, or in another suitable manner. An ingest station may automatically populate some metadata fields. For example, a metadata field may describe who checked out the storage volume on which the new content item was created. An ingest station may also be programmed to automatically populate metadata fields related to date, time, or other like information. Other manners of generating related metadata may be employed without deviating from the scope or spirit of the invention.

Ultimately, once altered content items and new content items have been archived, the storage volume may be checked in (76, FIG. 7). An ingest station may notify the server that the particular storage volume is once again available to be checked out.

The order of operation illustrated in FIG. 7 is merely illustrative. In embodiments of the invention, the processes described therein may be performed in a different order. For example, new content items may be archived (75) before new versions of copied content items are archived (73). Other orders of operation may be employed without deviating from the scope or spirit of the invention.

As discussed above, in embodiments of the invention, when a checked out storage volume is checked in, an operator may input metadata into an ingest station or an ingest station may generate metadata automatically. For example, an operator may employ an ingest station as shown in FIG. 2 to manually fill in the metadata fields shown in FIG. 4. For example, metadata my have been generated during the production of the audio data and recorded on paper. An operator also may obtain information to place in the metadata fields by, in the case of audio content, for example, listening to the audio. An operator may also input information from a physical media on which an audio content item is recorded. For example, an audiotape may have a label with identifying information that an operator may input as metadata. An operator may also scan such a label into the system so that an image of the label is included as metadata. Moreover, in embodiments in which metadata is generated during the production of the content items, an operator may query individuals involved in the production of the content about information that may be included as metadata. Other sources of information may also be available.

In further embodiments, an ingest station may generate metadata automatically. For example, an ingest station may divide a large audio file into a plurality of smaller audio files. In such embodiments, an ingest station may automatically populate certain metadata fields with information that describes the relationship of each of the smaller audio files to the original audio file. In some embodiments, an ingest station may recognize different voices and divide an audio file into a plurality of audio files, with each file containing dialog by a particular speaker.

In such embodiments, an ingest station may include voice-recognition software to determine where to divide a file. An ingest station may then populate metadata fields with appropriate data regarding the speaker, automatically. In such embodiments, an ingest station may run a program that causes the ingest station to perform these operations. For example, a program may cause an ingest station to scroll through an audio file, employing voice recognition software, and pause each time a new voice recognized. The program may then cause an ingest station to divide the audio file into two files, and then continue to scroll through the remainder of the original file. Each time an audio file is split, the portion which has been scrolled through may be stored as a separate file and metadata fields corresponding to the separate file may be populated with information ascertained by, for example, voice recognition software.

In other embodiments, an ingest station may automatically insert a time and date of archive into metadata fields. In such embodiments, an ingest station may have a program that causes the ingest station to read time and date data from an internal clock and input that information into automatically generated metadata fields. Other types of metadata may be generated automatically by an ingest station without deviating from the scope and spirit of the invention.

Figure 5:
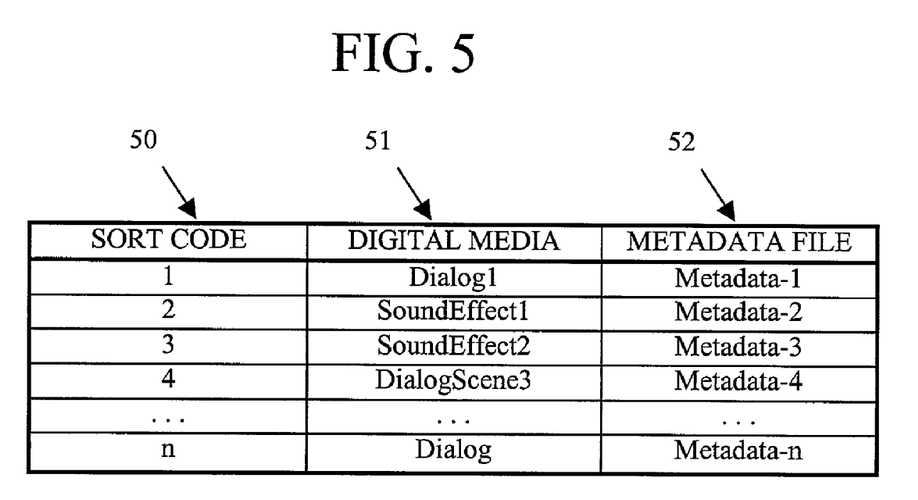
FIG. 5 shows a table that may be employed in embodiments of the invention to manage virtual links between digital media and metadata.

An ingest station may also establish a virtual link between a content item and related metadata. An example of a virtual link is shown in FIG. 5. FIG. 5 shows a three-column table which includes a column 50 for a sort code, a column 52 for a name of a digital media file, and a column 54 for a name of a metadata file. The sort code virtually links a content item to a related metadata file. Thus, the sort code facilitates retrieval of a content item with reference to the related metadata file. For example, referring to FIG. 5, if a search for a particular sound effect reveals a description of that sound effect in metadata file Metadata-2, then the sort code (2) virtually links the metadata file Metadata-2 to digital media file SoundEffect1. Further examples of locating content items by searching metadata files are provided below. Embodiments of the invention may employ other means of virtually linking stored content items to metadata files. In further embodiments, a virtual link may not be employed at all where, for example, content items are stored together with related metadata files.

In embodiments of the invention, a media storage and management system may store content items, metadata related to content items, and virtual links between them. In an example hardware environment shown in FIG. 1, content items may be stored in a storage medium 12. Metadata files may be stored in a database 10. Virtual links between content items and metadata files may also be stored in the database 10. In further embodiments, metadata and content items may be stored together in a database or in a storage medium, or another suitable storage arrangement may be employed.

In embodiments of the invention, once a content item has been stored and a virtual link has been established between the content item and related metadata, then retrieval of the content item may be facilitated. In embodiments of the invention, stored content items may be retrieved by employing an ingest station or content items may be retrieved from a remote location. In either embodiment, retrieval of a content item may be accomplished by searching metadata files. The complexity of the search may be dependent on the complexity of the metadata.

For example, in embodiments of the invention, content items may include entire movie soundtracks. In such embodiments, metadata files may include information about the movie soundtracks, such as the name of the movie, actors appearing in the movie, the movie genre, the year in which the movie was made or released, or other like information. In such embodiments, a search may be conducted for a movie soundtrack that includes a particular actor appearing in a movie in a particular year. For example, a metadata file related to the movie soundtrack for "Jerry Maguire" may include the following example fields:

| Movie Title | Jerry Maguire |
|---|---|
| Year Movie Made | 1996 |
| Directed By | Cameron Crowe |
| Actresses Include | Renee Zellweger |
|  | Kelly Preston |
| Actors Include | Tom Cruise |
|  | Cuba Gooding, Jr. |
|  | Jonathan Lipnicki |
| Characters | Jerry Maguire |
|  | Rod Tidwell |
|  | Dorothy Boyd |
|  | Avery Bishop |
|  | Ray Boyd |
| Subjects | Sports |
|  | Football |
|  | Romantic Comedy |

-continued

| Movie Title | Jerry Maguire |
|---|---|
| Audio Formats | 5.1 Discrete |
|  | 8-Channel Audio Discrete |
|  | 2-Track Stereo |
|  | Mono |
| Notable Quotes | "Show me the money." |
|  | "You had me at 'hello.'" |

In this example embodiment, a search may include a single search parameter of 'Movie Title=Jerry Maguire' to return the soundtrack for the movie "Jerry Maguire." Similarly, in the above example, a search including the search parameters 'movie made=1996' and 'Actors Include=Tom Cruise' may also yield the soundtrack for the movie "Jerry Maguire." Also, a search for a movie soundtrack which includes search parameters of 'Actors Include=Cuba Gooding, Jr.' and 'Notable Quotes="Show me the money."' may yield the soundtrack for the movie "Jerry Maguire." Accordingly, by relating metadata to a content item, such a movie soundtrack, retrieval of the content item may be facilitated. In the example above, one may retrieve the soundtrack for the movie "Jerry Maguire" even if their only recollection of the movie was that a character played by Cuba Gooding, Jr. said "Show me the money" or that a character played by Renee Zellweger said, "You had me at 'hello.'"

The example metadata fields shown above relating to "Jerry Maguire" are merely examples included for illustrative purposes. Embodiments of the invention may include fewer metadata fields, different metadata fields, or more metadata fields. The more rich and complex generated metadata is, the more flexible embodiments of a retrieval function may be. Generally, a retrieval function in embodiments of the invention may be made more complex by including greater amounts of metadata with respect to each stored content item.

In further embodiments of the invention, the content items may include portions of a movie soundtrack. In such embodiments, metadata associated with the portions of a movie soundtrack (content items) may include information pertaining to where the portions of the soundtrack fit into the movie, the subject matter of the particular content item, or other like information. For example, a content item may include only the portion of the "Jerry Maguire" soundtrack in which the character played by Cuba Gooding, Jr. utters the phrase, "Show me the money." Metadata associated with this content item may identify from which movie scene the content item originated, other characters present during the scene, other dialog that is part of this content item, or other like information. In such embodiments, a soundtrack of a movie, for example, may be archived as a plurality of smaller content items, with each content item having related metadata.

For example, in some embodiments, each sentence or phrase of dialog in a movie may be archived as a separate content item. Similarly, each sound effect in a movie may be archived as a separate content item. In such embodiments, one may locate a particular content item more quickly than in an embodiment in which an entire movie soundtrack is archived as a single content item. One may retrieve, for example, a single quote as discussed above. However, one may also retrieve multiple portions of a movie soundtrack with an appropriate search. In embodiments in which, for example, the soundtrack for "Jerry Maguire" is stored as a plurality of audio content items, a search with parameters of 'Actors Include=Tom Cruise' and 'Movie Title=Jerry Maguire' may yield content items that include all of the dialog spoken by Tom Cruise in the movie Jerry Maguire. Similarly, an appropriate search may yield a plurality of content items that include an entire conversation from a movie or the dialog of an entire movie scene.

In further embodiments of the invention, because metadata may be generated during the production of the content items, the metadata may also include information about the production of the content itself. In an example embodiment in which the content items include movie audio data, multiple versions of the audio data may be archived with metadata containing information about the multiple versions. For example, during the production of the audio for the movie "Jerry Maguire," the expression, "Show me the money" may have been recorded several times for a particular scene even though only one version ultimately was mixed into the movie. During production, each of the versions may be archived separately with related metadata generated to describe the various versions. In such an embodiment, a rich collection of audio data may be available such that a movie or a portion of a movie may be re-mixed. Other embodiments of the invention may employ archiving different versions of audio data for a movie so that the audio data may be re-mixed to omit profanity, to provide dialog in a different language, or for other like purposes.

Also, in embodiments of the invention in which metadata may be generated during the production of a content item, such as during the production of movie audio, metadata may be more detailed and more accurate than where metadata is generated after production has been completed. For example, each actor, or other people in a movie scene (e.g. extras), may be observed or queried for information, such as name, age, height, eye color, and other like information. Similarly, those producing the audio may be observed or queried for information about the production, such as, for example, how a particular sound effect was generated, or other like information. When metadata is generated after production of a content item has been completed, such as, for example, by listening to movie audio or watching a movie, some of the these sources of information may be unavailable.

Although example embodiments discussed above concern audio data from the movie "Jerry Maguire" for purposes of illustration, embodiments of the invention may include content items, such as audio data, from a variety of sources, such as other movies, television programs, pilots, commercials, or other like sources of audio data. In such embodiments, a search of all metadata files for information about a particular actor may yield audio content from movies in which the actor has appeared, as well as from television programs, commercials, and other sources of archived audio data pertaining to the particular actor. Similarly, depending on the richness of the metadata generated, a search of all metadata files for information about 'teacher' or 'doctor' characters, for example, may yield audio data from a plurality of movies, television shows, and the like, of teacher or doctor characters. Such a collection of audio data may be of great value to someone who is casting, for example, a teacher or a doctor.

Further embodiments of the invention may include other types of content items. For example, although example embodiments discussed above include audio data as the content items, video data or a combination of audio data and video data may comprise the content items. In an example embodiment, a feature film may be divided into a plurality of video content items, with or without associated audio content. In such an embodiment, metadata may be generated that describes the production or content of a particular video content item. Accordingly, metadata may be searched to locate video content items showing, for example, city scenes. In further embodiments, more detailed metadata may be searched to locate video content items showing a particular city, such as New York City, or a particular actor in a particular city, such as Tom Cruise in New York City. Further embodiments may include other types of video content or other combinations of audio/video content.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A method for managing a plurality of content items comprising:
    storing a library of content items in a storage medium;
    checking out at least one storage volume of a plurality of storage volumes by marking the at least one storage volume as having been checked out, the at least one storage volume marked so as to facilitate locating and retrieving the storage volume after some time has passed;
    checking in the at least one storage volume;
    if no content items fivm the library of content items were stored on the at least one storage volume when the at least one storage volume was checked out, determining whether any new content items are stored on the at least one storage volume when the at least one storage volume is checked in and updating the library with any new content items; and
    if one or more content items from the library of content items were stored on the at least one storage volume when the at least one storage volume was checked out, determining whether any new or changed content items are stored on the at least one storage volume when the at least one storage volume is checked in and updating the library with any new or changed content items,
    wherein, if one or more content items from the library are to be stored on the at least one storage volume when the at least one storage volume is checked out storing one or more content items from the library on the at least one storage volume comprises:
       locating at least one requested content item in the library
       copying the at least one requested content item onto the at least one storage volume; and
       marking the at least one requested content item as having been checked out, the at least one content item marked so as to facilitate locating and retrieving the content item after some time has passed;
    determining whether two or more content items from the library of content items were stored on the at least one storage volume when the at least one storage volume was checked out, upon determining two or more content items were stored on the storage volume, the step of determining whether any new or changed content items are stored on the at least one storage volume when the at least one storage volume is checked in and updating the library with any new or changed content items, comprises:
       determining, for each content item of the two or more content items when the at least one storage volume is checked in, whether the content item has been altered;

marking, for each content item of the two or more content items that are determined to have not been altered when the at least one storage volume is checked in, the content item as having been checked in; and archiving, for each content item of the two or more content items that are determined to have been altered when the at least one storage volume is checked in, the altered content item in the library as a new version of the content item.

2. The method for managing a plurality of content items according to claim 1, wherein the plurality of storage volumes comprises removable hard disk drives.

3. The method for managing a plurality of content items according to claim 1, wherein the plurality of storage volumes comprises a plurality of storage locations on a single storage device.

4. The method for managing a plurality of content items according to claim 1, wherein the plurality of storage volumes comprises a plurality of virtual storage locations.

5. The method for managing a plurality of content items according to claim 1, wherein marking the at least one requested content item as having been checked out comprises storing information including when the at least one requested content item was checked out and by whom the at least one requested content item was checked out.

6. The method for managing a plurality of content items according to claim 1, wherein marking the at least one storage volume as having been checked out comprises storing information including when the at least one storage volume was checked out and by whom the at least one storage volume was checked out.

7. The method for managing a plurality of content items according to claim 1,
wherein determining any new content items are stored on the at least one storage volume comprises detecting whether any new content items were stored on the at least one storage volume while the at least one storage volume was checked out; and
wherein determining whether any new or changed content items are stored on the at least one storage volume comprises:
detecting whether any content items that were stored on the at least one storage volume were altered while the at least one storage volume was checked out; and
detecting whether any new content items were stored on the at least one storage volume while the at least one storage volume was checked out.

8. The method for managing a plurality of content items according to claim 7, wherein detecting whether any content items that were stored on the at least one storage volume were altered comprises:
comparing a content item stored on the at least one storage volume with a corresponding content item stored on the library that was stored on the at least one storage volume when the at least one storage volume was checked out.

9. The method for managing a plurality of content items according to claim 7, wherein detecting whether any content items that were stored on the at least one storage volume were altered comprises:
employing a code to indicate whether a content item has been altered.

10. The method for managing a plurality of content items according to claim 1,
wherein updating the library with any new content items comprises archiving new content items; and
wherein updating the library with any new or changed content items comprises:
archiving new content items; and
archiving changed content items as new versions of previously archived content items.

11. The method for managing a plurality of content items according to claim 10, wherein archiving new content items comprises: storing the new content items;
storing metadata related to the new content items; and
creating associations between the new content items and the metadata related to the new content items.

12. The method for managing a plurality of content items according to claim 10, wherein archiving changed content items as new versions of previously archived content items comprises:
storing the changed content items;
storing metadata related to the changed content items; and
creating associations between the changed content items and the metadata related to the changed content items.

13. The method for managing a plurality of content items according to claim 10, wherein the new content items and the changed content items are archived automatically.

14. The method for managing a plurality of content items according to claim 1, wherein the library of content items is stored in a storage medium.

15. The method for managing a plurality of content items according to claim 1, wherein the plurality of storage volumes are physical storage volumes.

16. The method for managing a plurality of content items according to claim 15, wherein each storage volume of the plurality of storage volumes comprises at least one of a removable hard disk drive, a portable storage cartridge, and a digital tape.

17. The method for managing a plurality of content items according to claim 1,
wherein, if two or more content items from the library of content items were stored on the at least one storage volume when the at least one storage volume was checked out, the step of determining whether any new or changed content items are stored on the at least one storage volume when the at least one storage volume is checked in and updating the library with any new or changed content items, further comprises:
determining, when the at least one storage volume is checked in, whether any new content items were stored on the at least one storage volume when the at least one storage volume was checked out; and
archiving, if it is determined that new content items were stored on the at least one storage volume, the new content items in the library.

18. A system for managing a plurality of content items comprising:
a library system tat is computer implemented for storing content items; and
a plurality of storage volumes, at least one of which is checked out as a checked out storage volume storing either no or one or more of the content items from the library system and wherein the checked out storage volume is checked in storing one or more content items for archive, including new content items and new versions of content items,
wherein the library system controls which, if any, content items are stored onto a storage volume to be checked out by:
locating a requested content item in the library system;
copying the requested content item onto the storage volume to be checked out; and marking the requested content item as having been checked out, the content item marked so as to facilitate locating and retrieving the content item after some time has passed;

wherein the library system controls which storage volumes are checked out by marking the storage volume to be checked out as having been checked out, the storage volume marked so as to facilitate locating and retrieving the storage volume alter some time has passed;

wherein the library system is updated when the checked out storage volume is checked in;

wherein the checked out storage volume is checked out storing two or more of the content items from the library system;

wherein the library system is configured to determine, when the checked out storage volume is checked in and for each content item of the two or more of the content items from the library system that were stored on the checked out storage volume, whether the content item has been altered;

wherein the library system is configured to mark, for each content item of the two or more of the content items from the library system that were stored on the checked out storage volume and were determined to have not been altered when the checked out storage volume is checked in, the content item as having been checked in; and wherein the library system is configured to archive, for each content item of the two or more of the content items from the library system that were stored on the checked out storage volume and were determined to have been altered when the checked out storage volume is checked in, the altered content item in the library system as a new version of the content item.

19. The system for managing a plurality of content items according to claim 18, wherein the plurality of storage volumes comprises removable hard disk drives.

20. The system for managing a plurality of content items according to claim 18, wherein the plurality of storage volumes comprises a plurality of storage locations on a single storage device.

21. The system fix managing a plurality of content items according to claim 18, wherein the plurality of storage volumes comprises a plurality of virtual storage locations.

22. The system for managing a plurality of content items according to claim 18, wherein marking the requested content item as having been checked out comprises storing information including when the requested content item was checked out and by whom the requested content item was checked out.

23. The system for managing a plurality of content items according to claim 18, wherein marking the storage volume to be checked out as having been checked out comprises storing information including when the storage volume to be checked out is checked out and by whom the storage volume to be checked out is checked out.

24. The system for managing a plurality of content items according to claim 18, wherein the library system is updated when the checked out storage volume is checked in by:

detecting whether any content items stored on the checked out storage volume being checked in were altered while the checked out storage volume was checked out; and detecting whether any new content items were stored on the checked out storage volume being checked in while the checked out storage volume was checked out.

25. The system for managing a plurality of content items according to claim 24, wherein detecting whether any content items stored on the checked out storage volume being checked in were altered comprises:

comparing a content item stored on the checked out storage volume with a corresponding content item stored on the library system that was stored on the checked out storage volume when the checked out storage volume was checked out.

26. The system for managing a plurality of content items according to claim 24, wherein detecting whether any content items stored on the checked out storage volume being checked in were altered comprises:

employing a code to indicate whether a content item has been altered.

27. The system for managing a plurality of content items according to claim 18, wherein the library system is updated when the checked out storage volume is checked in by:

archiving new content items; and archiving new versions of content items as new versions of previously archived content items.

28. The system for managing a plurality of content items according to claim 21, wherein archiving new content items comprises:

storing the new content items;

storing metadata related to the new content items; and creating associations between the new content times and the metadata related to the new content items.

29. The system for managing a plurality of content items according to claim 27, wherein archiving new versions of content items as new versions of previously archived content items comprises:

storing the new versions of content items;

storing metadata related to the new versions of content items; and creating associations between the new versions of content items and the metadata related to the new versions of content items.

30. The system for managing a plurality of content items according to claim 21, wherein the new content items and the new versions of content items are archived automatically.

31. The system for managing a plurality of content items according to claim 18, wherein the plurality of storage volumes are physical storage volumes.

32. The system for managing a plurality of content items according to claim 31, wherein each storage volume of the plurality of storage volumes comprises at least one of a removable hard disk drive, a portable storage cartridge, and a digital tape.

33. The system for managing a plurality of content items according to claim 18, wherein the library system is configured to determine, when the checked out storage volume is checked in, whether any new content items were stored on the storage volume when the storage volume was checked out; and wherein the library system is configured to archive, if it is determined that new content items were stored on the checked out storage volume, the new content items in the library.

* * * * *